United States Patent
Bland et al.

(10) Patent No.: US 11,041,382 B2
(45) Date of Patent: Jun. 22, 2021

(54) VECTOR STRAIN SENSOR SYSTEM FOR A WELLBORE

(71) Applicant: Halliburton Energy Services, Inc., Houston, TX (US)

(72) Inventors: Henry Clifford Bland, Calgary (CA); Mikko Jaaskelainen, Katy, TX (US); Joshua Lane Camp, Friendswood, TX (US); Tirumani Swaminathan, Houston, TX (US); Eric James Davis, El Cerrito, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 37 days.

(21) Appl. No.: 16/694,825

(22) Filed: Nov. 25, 2019

(65) Prior Publication Data
US 2021/0156247 A1    May 27, 2021

(51) Int. Cl.
*E21B 43/26* (2006.01)
*E21B 49/00* (2006.01)
*G01B 21/32* (2006.01)
*E21B 47/12* (2012.01)

(52) U.S. Cl.
CPC ............. *E21B 49/00* (2013.01); *E21B 43/26* (2013.01); *E21B 47/12* (2013.01); *G01B 21/32* (2013.01)

(58) Field of Classification Search
CPC ....... E21B 43/26; E21B 49/006; E21B 49/008
See application file for complete search history.

(56) References Cited

U.S. PATENT DOCUMENTS

| | | | |
|---|---|---|---|
| 7,140,434 B2 | 11/2006 | Chouzenoux et al. | |
| 8,915,315 B2 * | 12/2014 | Boulet | E21B 47/01 175/325.2 |
| 9,279,666 B1 | 3/2016 | Balasubramaniam et al. | |
| 9,880,302 B2 | 1/2018 | Wuestefeld et al. | |
| 10,620,065 B2 * | 4/2020 | Polsky | G01L 1/26 |
| 2012/0143524 A1 | 6/2012 | Chen et al. | |
| 2012/0143525 A1 | 6/2012 | Chen et al. | |
| 2013/0199787 A1 * | 8/2013 | Dale | E21B 43/30 166/302 |
| 2019/0004195 A1 * | 1/2019 | Hornman | G01V 1/226 |
| 2020/0319362 A1 * | 10/2020 | Guner | G01V 3/104 |

OTHER PUBLICATIONS

Francois et al., "An Embedded 3D Strain Tensor Sensor Based on the Eshelby's Inclusion", Experimental Mechanics (2017) 57:801, pp. 1-29.
Rossetto, et al., "Three-dimensional Strain Rosettes: Pattern Selection and Performance Evalutaion", Experimental Mechanics (1975) 15:375.

* cited by examiner

*Primary Examiner* — Kenneth L Thompson
(74) *Attorney, Agent, or Firm* — Kilpatrick Townsend & Stockton LLP (57) ABSTRACT

A system for downhole wellbore vector strain sensing including a strain sensor positionable between an outer surface of a wellbore casing and a subterranean formation for sensing a plurality of strain tensor elements, the plurality of strain tensor elements comprising multiple components of a strain tensor; a computing device positionable at a surface of a wellbore and communicatively coupled to the strain sensor; and a communication link between the strain sensor and the computing device for communicatively coupling the strain sensor to the computing device to relay strain data, the strain data comprising the plurality of strain tensor elements.

17 Claims, 5 Drawing Sheets

VECTOR STRAIN SENSOR SYSTEM FOR A WELLBORE

TECHNICAL FIELD

The present disclosure relates generally to hydraulic fracturing in a well, particularly (although not exclusively), this disclosure relates to monitoring fracture-induced strain near a wellbore using a strain sensing system.

BACKGROUND

Stimulation of a well, including but not limited to fracturing, can be used to extract hydrocarbons from a subterranean formation (e.g., an oil well or a gas well). For example, hydraulic fracturing can include pumping a treatment fluid that includes a proppant mixture into a wellbore. The treatment fluid can enter the formation through perforations in the wellbore and create fractures in the subterranean formation, and the proppant mixture can fill the fractures to prop the fractures open. Propping the fractures open can allow the hydrocarbons to flow from the subterranean formation through the perforations and into the wellbore.

The wellbore and the subterranean formation surrounding the wellbore can experience various amounts of deformation during the hydraulic fracturing process. For example, during the hydraulic fracturing process of a wellbore, a strain field can surround and radiate outward from the fracture as a fracture is formed in the subterranean formation. The strain field can come into contact with the wellbore currently being treated, other fractures that have been created in the wellbore currently being treated, or the wellbore or fractures of an offset well. Measuring the strain can provide beneficial data that can be used during the treatment of a wellbore.

DETAILED DESCRIPTION

Certain aspects and examples of the disclosure relate to systems and methods for monitoring fracture-induced strain near a wellbore using a strain sensing system. In some aspects, the strain sensing system may include strain sensors positioned outside of a wellbore casing. The strain sensors are able to measure multiple components of the strain at the wellbore, within the cement surrounding the wellbore, or at the subterranean formation surrounding the wellbore. Strain sensors measure strain relative to three-dimensional vector-directions, which may include the axial direction of the wellbore or other directions which diverge from the wellbore axis. Strain sensors can be directional, measuring strain along a single vector direction, or complex, measuring strain along more than one vector direction. Complex strain sensors may output strain measurements relative to orthogonal axes (X,Y,Z) or non-orthogonal, non-coplanar axes. Additionally, complex strain sensors may internally combine the measurements of the strain acting along different axes so that a general strain measurement characterizes the magnitude of the strain without providing direction (for example, radial strain magnitude). By combining multiple strain sensors (either directional strain sensors or complex strain sensors), an understanding of the total strain in three-dimensions can be computed. The strain measurements can be used directly or can be processed by a computer to re-align the strain sensor measurements into earth-aligned or wellbore-aligned Cartesian coordinates. Multiple strain measurements can be combined to determine a 3×3 strain tensor (or a subset of its elements) which is representative of the multidimensional strain at a point along a wellbore.

The strain sensing system may also include a computing device that communicates with the strain sensors using a communication link, which may be wired or wireless, and a power source connected to the strain sensors, if required. Some strain sensors (e.g. fiberoptic strain gauges) are passive and therefore do not require a power source.

The strain sensors may send strain data based on the measurements of the strain to the computing device. For example, the strain data sent by the strain sensors may include the multiple strain measurements along multiple three-dimensional vector directions. The computing device may analyze the strain data and may use the strain data to provide improved well models, such as fracturing models and flow models, that incorporate the strain data. Additionally, the computing device may analyze the strain data and adjust a treatment of the wellbore, such as a hydraulic fracturing treatment, based on the strain data. In some aspects, this treatment adjustment may also be based on the improved well models created by the computing device.

Utilizing the multidimensional-strain data received from the strain sensors may enable a more optimized and lower-cost hydraulic fracture treatment to be implemented in well systems and also enable more comprehensive well models to be created. By optimizing the hydraulic fracture treatment, a higher-producing well system may be produced.

Additionally, while the examples discussed in this disclosure relate to monitoring fracture-induced strain near a wellbore using a strain sensing system, this same strain sensing system may be used in a multitude of other environments and not exclusively for monitoring fracture-induced strain. For example, the strain sensing system may be used in sub-sea well systems, a non-fractured well, a steam assisted gravity drain, underground gas storage, geothermal production, underground water storage, mining, $CO_2$ sequestration, etc.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
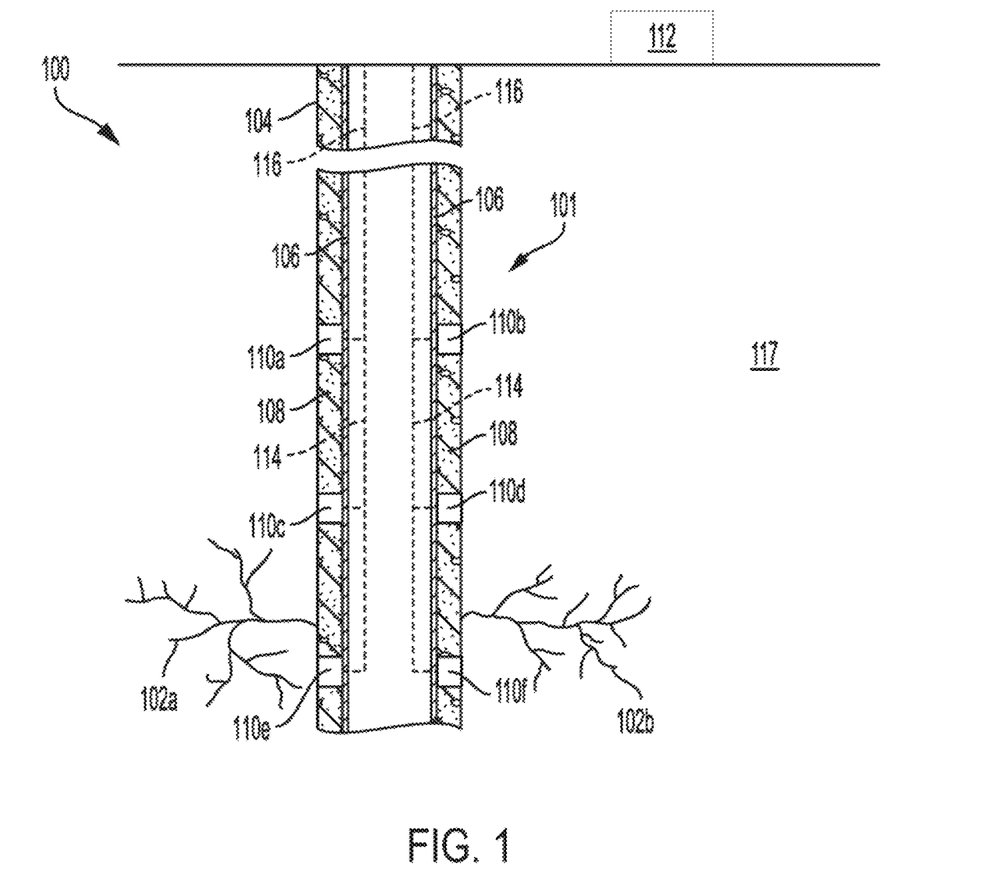
FIG. 1 is a cross-sectional view of an example of a well system for monitoring fracture-induced strain near a wellbore using a strain sensing system according to some aspects of the present disclosure.

FIG. 1 is a cross-sectional view of a well system 100 according to some aspects of the present disclosure. The well system 100 may include a sensor system 101 for downhole wellbore vector strain sensing that may include multiple strain sensors 110a-f, a computing device 112 positioned at a surface of a wellbore 104, a communication link 114 between the strain sensors 110a-f and the computing device 112, and a power source 116.

Figure 3:
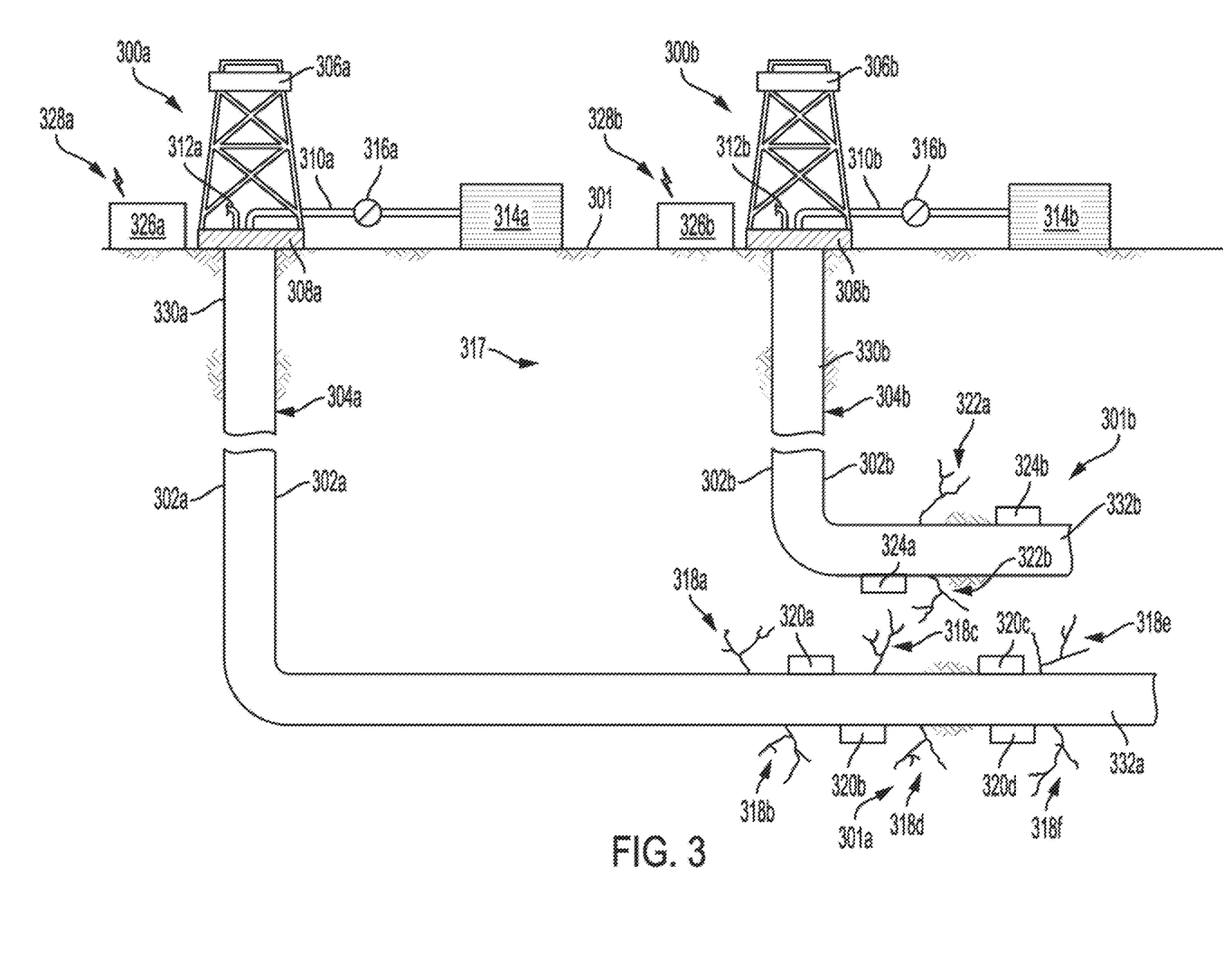
FIG. 3 is a schematic diagram of examples of two well systems for monitoring fracture-induced strain near a wellbore using a strain sensing system according to some aspects of the present disclosure.

The well system 100 includes the wellbore 104 extending from a surface and drilled into the ground through a subterranean formation 117 for extracting hydrocarbons (e.g., natural gas or oil) from the subterranean formation 117. The wellbore 104 is shown as a vertical wellbore; however, in some aspects the wellbore 104 may be a lateral wellbore that extends substantially horizontally from the vertical wellbore (as is shown in FIG. 3).

The well system 100 may have been constructed and completed in any suitable manner, such as by use of a drilling assembly having a drill bit for creating the wellbore 104. A casing 106 may be positioned in the wellbore 104 during the completion of the well system 100. The casing 106 may extend for a length of the wellbore 104 and may help support the stability of the wellbore 104. The casing 106 may include tubular casing sections connected by end-to-end couplings. In some aspects, the casing 106 may be made of a suitable material such as steel. Before the casing 106 is positioned in the wellbore 104, a plurality of the strain sensors 110a-f may be coupled to the outer surface of the casing 106. Further details regarding the measurements that the strain sensors 110a-f may collect are described below.

In some aspects, cement 108 may be injected into the wellbore 104 and allowed to set between an outer surface of the casing 106 and an inner surface of the wellbore 104. After the casing 106 is positioned in the wellbore 104 with the strain sensors 110a-f coupled to the outer surface of the casing 106, the cement 108 may be injected into the wellbore 104 so that the strain sensors 110a-f become encased in the cement 108 as the cement sets.

The well may be cemented using conventional cementing processes where cement 108 is injected inside the casing 106 and pumped to the end of the casing 106 where it exits and is forced outside the casing 106 in the annular space between the formation 117 and the casing 106. The cement 108 may alternatively be pumped in the annular space between the outside of the casing 106 and the formation 117. The strain sensors 110a-f may detect the movement of the cement 108 outside the casing 106 and the cementing operation can be controlled based on the measured output from the plurality of the strain sensors 110a-f. Cement location, speed of cement front movement and cement viscosity may be detected by the strain sensors 110a-f as the cement 108 moves from sensor to sensor and creates drag and strain on each individual sensor. The time-dependent cement movement can be used as an input to control the cement pumping operation.

Thus, the strain sensors 110a-f may be deployed and cemented into place as part of a standard well completion process. The strain sensors 110a-f are designed and manufactured so that they may withstand the temperatures and pressures found at the location along the wellbore 104 to which they are coupled while continuing to function properly.

In some aspects, the strain sensors 110a-f may be installed in the subterranean formation 117 proximate to the wellbore 104 before the well system 100 is completed. For example, various holes may be formed in the subterranean formation 117 and the strain sensors 110a-f may be inserted into the holes. After the strain sensors 110a-f are inserted into the holes, the casing 106 may be positioned in the wellbore 104 and cement 108 may be injected into the wellbore 104. The cement 108 may also fill the various holes as the cement 108 is injected into the wellbore 104 so that the strain sensors 110a-f are fixed in place within the holes.

In some aspects, the strain sensors 110a-f may be installed in the well system 100 after the completion of the well system 100. For example, after the casing 106 has been positioned in the wellbore 104 and the cement 108 has set between the outer surface of the casing 106 and the inner surface of the wellbore 104, the casing 106 and the cement 108 may be perforated so that various openings are created in the casing 106 and various cavities form in the cement 108. The perforation may be performed using an explosive or a non-explosive process. The non-explosive process may be beneficial because it may allow for more control of the shape, quality, and penetration distance of the perforation.

In some aspects, the cavities may only extend partially into the cement 108 or the cavities may extend completely through the cement 108, e.g., from the outer surface of the casing 106 to the inner surface of the wellbore 104. Additionally, the cavities may extend completely through the cement 108 and into the subterranean formation 117.

The strain sensors 110a-f may then be inserted into the cavities formed at least in the cement 108 and a plug, or any other suitable sealing device or material, may be used to close the cavities. The plug may protect the strain sensors 110a-f and help with preventing damage to the strain sensors 110a-f during treatment or hydraulic fracturing of the well system 100. For example, the plug may be cement, and the cement may be injected into the cavities to fix each of the strain sensors 110a-f in place within the cavities and to close off the cavities and the perforations.

The well system 100 may have undergone hydraulic fracturing after the well completion process is finished so that fractures 102a-b are formed in the subterranean formation 117 surrounding the well system 100. These fractures may permit the hydrocarbons to flow from the formation 117 into the well system 100. Though two fractures 102a-b are shown in FIG. 1, more or fewer fractures may be formed.

The plurality of strain sensors 110a-f may be spaced apart from one another at any suitable distance along the outer surface of the casing 106. For example, the strain sensors 110a-f may be spaced apart from one another at a distance ranging from about 1 m to about 1000 m, from about 1 m to about 50 m, or from about 5 m to about 20 m. The coupling location along the outer surface of the casing 106 and the distance between each of the plurality of strain sensors 110a-f may depend on what areas of the wellbore 104 a user seeks to take measurements from and/or what data is sought to be measured and gathered by the strain sensors 110a-f. For example, the strain sensors 110a-f may be coupled to the casing 106 such that they are positioned in a production zone when the casing 106 is positioned in the wellbore 104.

While six strain sensors 110a-f are shown in FIG. 1, more or fewer strain sensors may be used, e.g., 1, 2, 3, 4, 5, 7, 8, etc. Additionally, while the strain sensors 110a-f are shown as extending through the entire thickness of the cement 108, in some aspects, the strain sensors 110a-f may extend only partially through the thickness of the cement 108 so that an outer surface of each of the strain sensors 110a-f is positioned close to, but not in contact with, the subterranean formation 117.

The strain sensors 110a-f may be point sensors such as resistive strain gauges acting on faces of a polyhedron (e.g., a cube or a dodecahedron) for measuring multiple strain components, three-dimensional piezoresistive sensors, graphene transistor strain sensors, Fiber Bragg grating strain sensors, or a gravitational direction sensing element. In some aspects, the sensors 110a-f may each be the same type of sensor (e.g., sensors 110a-f may all be graphene transistor strain sensors) or the sensors 110a-f may be a combination of different types of sensors (e.g., sensors 110a and 110b may each be a resistive strain gauge, 110c and 110d may each be a three-dimensional piezoresistive sensor, 110e may be a graphene transistor strain sensor, and 110f may be a Fiber Bragg grating strain sensor). The type of strain sensor used in the wellbore 104 may be chosen based on where the strain sensor 110a-f will be located along the wellbore 104 and the temperature, pressure (e.g., bottom-hole pressure), magnitude of expected strain, or any other factor that the strain sensor 110a-f may be subjected to at that location.

The multiple components of strain measured by sensors 110a-f may be elements of a strain tensor. A complete strain tensor, which will be explained in further detail below, is a multidimensional, 3×3 matrix of strain tensor elements. Measuring multiple components of strain provides data which may provide more comprehensive information relating to deformation of the wellbore or the subterranean formation due to production-induced geomechanical stresses, hydraulic fracturing, or other sub-surface processes.

Each of the strain sensors 110a-f may be in communication with a computing device 112 via a communication link 114. The computing device 112 is discussed in further detail below with respect to FIG. 2. However, in some aspects, the computing device 112 may include a hydraulic fracturing control system. The communication link 114 may communicatively couple the computing device 112 to the strain sensors 110a-f so that the strain sensors 110a-f may relay sensor data to the computing device 112.

In some aspects, the communication link 114 may be a wireless communication link, as is discussed in further detail below with respect to FIG. 3, or the communication link 114 may be a wired communication link, as is shown in FIG. 1.

The wireless communication link may be electrical, acoustic, or pressure-based, and the wireless communication may be designed for communication to the surface from the sensor location, or from sensor to sensor where each sensor module may act as a repeater module, or a short hop communication to a temporary logging tool with a communication hub. The temporary logging tool may be conveyed using wireline, slickline, coiled tubing, or a mechanical rod that can be inserted. The temporary logging tool may be tractored for access into a horizontal section of the wellbore or pushed into a horizontal section of the wellbore. A permanent short hop wireless system may communicate with a wired communication link clamped outside a tubing deployed inside the casing. The tubing may be used to restrict the wellbore flowing area, or used to produce hydrocarbons through the inside of the tubing. It may be desirable to increase hydrocarbon production velocities using a velocity string such that (e.g.) liquids may be lifted to the surface with production of (e.g.) gas to avoid having water falling to the bottom of a gas well and thereby reducing gas production.

The wired communication link 114 may be an electrical signal wire, a fiberoptic cable, a hybrid electro-optical cable that communicates data using telemetry, or any other suitable wired connection between the strain sensors 110a-f and computing device 112. The wired communication link may be located outside the casing and attached using devices, e.g., clamping devices or centralizers with dedicated channels for the wired communication link.

Each of the strain sensors 110a-f may be connected to a power source 116 such as a wired electrical supply connected to a power supply at the surface of the well system 100. In some aspects, the wired electrical supply may be run parallel to the wired communication link 114 to connect the strain sensors 110a-f to the power supply. In other aspects, the strain sensors 110a-f may be connected to a power source 116 that is either built into the strain sensors 110a-f or directly connected to the strain sensors 110a-f, e.g., battery power, inductive charging, or the energy harvesting of vibrations. Additionally, the strain sensor 110a-f may not require any electrical power to operate properly.

During the lifetime of a wellbore 104, the wellbore 104 may undergo hydraulic fracturing and/or other sub-surface processes. These processes may produce a strain on the wellbore 104 or the surrounding subterranean formation 117. The sensor data measured and collected by the plurality of strain sensors 110a-f and relayed to the computing device 112 may include measurements of strain caused by deformation of the wellbore 104, the cement 108, the subterranean formation 117 surrounding the wellbore 104, or the creation or expansion of fractures 102a-b. For example, when hydraulic fracturing is occurring in the well system 100, the creation of the fractures 102a-b may cause multidimensional changes in the strain of the wellbore 104, the cement 108, the subterranean formation 117 surrounding the wellbore 104, or the subterranean formation 117 surrounding other, already-formed fractures. The strain sensors 110a-f may measure these strain changes and gather strain data relating to the well system 100. While the sensor system 101 is primarily intended for monitoring the process of hydraulic fracturing, the sensor system 101 could be applied to monitoring other processes such as thermal, mechanical, or chemical, which cause changes to the stress in the subterranean formation 117, wellbore 104, or cement 108.

Strain-measurement within well systems is often limited to the measurement of a single component of strain that is commonly aligned with the wellbore axis. For example, single component strain data may detect damage to the wellbore casing as a result of production-induced geomechanical stresses or hydraulic fracturing. As mentioned earlier, a complete strain tensor is a multidimensional, 3×3 matrix of strain-tensor elements as shown below:

$$\begin{bmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{bmatrix}$$

A tensor is a multidimensional array of numerical values that can be used to describe the physical state or properties of a material and may be particularly useful in describing a stress or strain acting on an object because strain may cause multidimensional deformation of the object.

Figure 5:
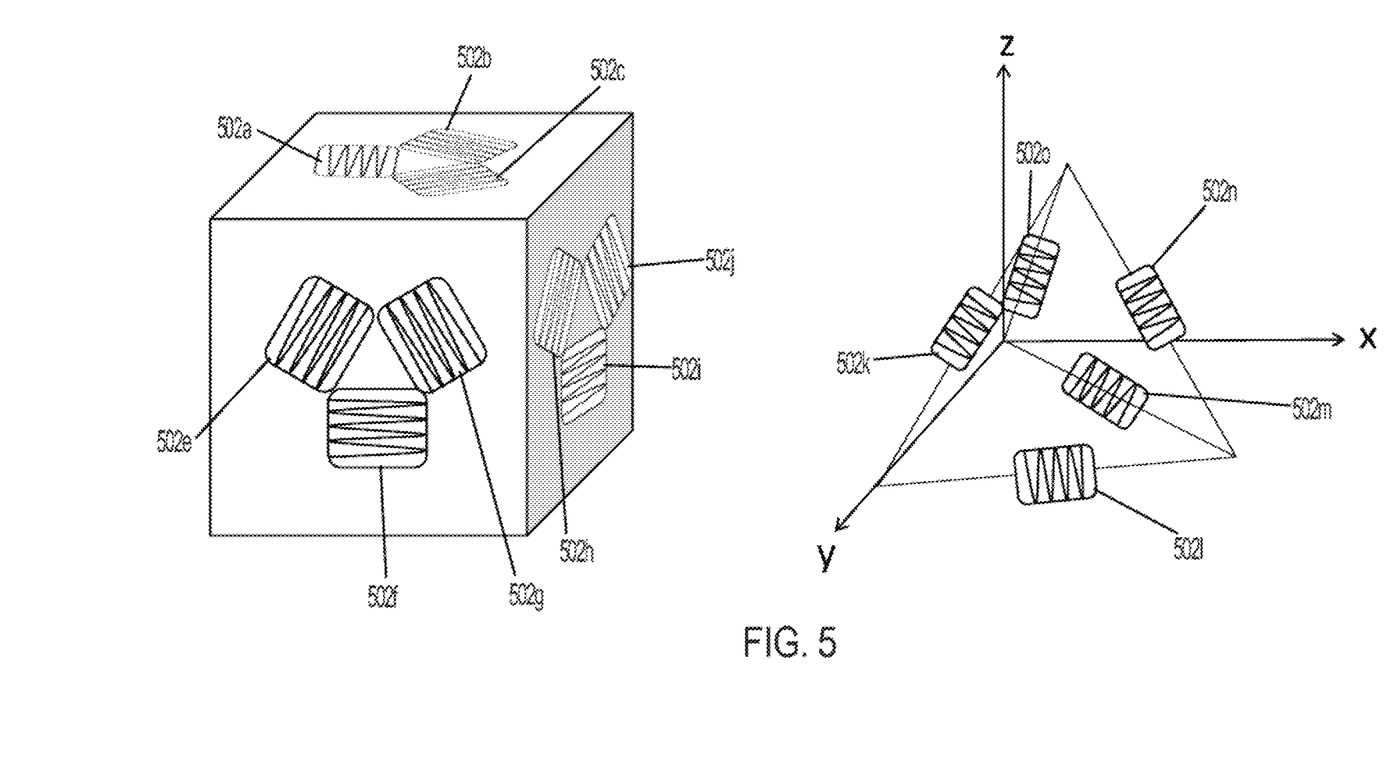
FIG. 5 is a three-dimensional vector strain rosette diagram for use with a strain sensing system according to some aspects of the present disclosure.

A rosette of vector strain sensors may be employed to measure strain along different axes which are not aligned to the tensor axes, however, elements of the tensor may be computed by a combination of multiple strain measurements taking into consideration the angles involved. For example, see FIG. 5 depicting several rosettes of vector strain sensors 502a-502o where the vector strain sensors 502a-502o are configured to measure strain along different axes that are not aligned with the tensor axes X, Y, and Z. With sufficient observations, one can invert the system of linear equations relating the projection of strain tensor elements onto the measured strain sensor to calculate the strain tensor elements within regularized Cartesian space.

A coordinate transformation of the strain tensor matrix, shown above, results in the principal strain components. In some aspects, at least some of the strain elements may be positioned in such a way that they measure the strain in the direction of the principal strain components. Thus the strain elements may include the principal strain components.

Measuring multiple components of strain provides multidimensional data which may provide more comprehensive information relating to deformation of the wellbore or the subterranean formation due to production-induced geomechanical stresses, hydraulic fracturing, or other sub-surface processes.

The strain sensors 110a-f used in the strain sensing system 101 here may each detect, or measure, a plurality of different strain tensor elements. Each of the strain sensors 110a-f may measure multiple components of strain by sensing strain or changes in strain along multiple non-parallel axes. The plurality of strain tensor elements measured by the strain sensors 110a-f may be subsets, and thus multidimensional elements, of the strain tensor. For example, the strain sensors 110a-f may each measure the diagonal strain tensor elements. By measuring a plurality of strain tensor elements, a larger and more complete set of strain data reflecting multiple dimensions of the strain changes may be measured and gathered. In some embodiments, both the magnitude and the direction of strain changes may be measured by the strain sensors 110a-f.

The strain sensors 110a-f may relay, or transmit, the sensor data measured to the computing device 112. The computing device 112 may then use the sensor data to adjust sub-surface processes or generate detailed models. For example, if the computing device 112 includes a hydraulic fracturing control system, the hydraulic fracturing control system may use the data to adjust a treatment or a hydraulic fracturing process occurring in the well system 100 in order to perform an improved and lower-cost hydraulic fracturing treatment. Receiving the sensor data may allow for an improved understanding of the strain changes in a target reservoir in the subterranean formation 117 and may enable the hydraulic fracturing control system to optimize the stage sequencing during the hydraulic fracturing process.

In some aspects, the computing device 112 may use the sensor data received from the strain sensors 110a-f to improve and/or create models of the well system 100. For example, the sensor data may be used to align fracturing models with measured fracturing responses and/or to create more accurate flow models that may predict fracture growth. These improved fracture growth models, which may be based on the sensor data and the amount of fluid injected into the wellbore 104 to create a fracture 102a-b, may enable a more accurate back calculation of the volume of fluid pumped into each fracture 102a-b. So the fracture growth model may be used by the hydraulic fracturing control system to improve fracture efficiency (e.g., the volume of fluid and/or proppant in each fracture) and adjusting a pumping schedule based on the calculated measurements of the volume of fluid.

Figure 2:
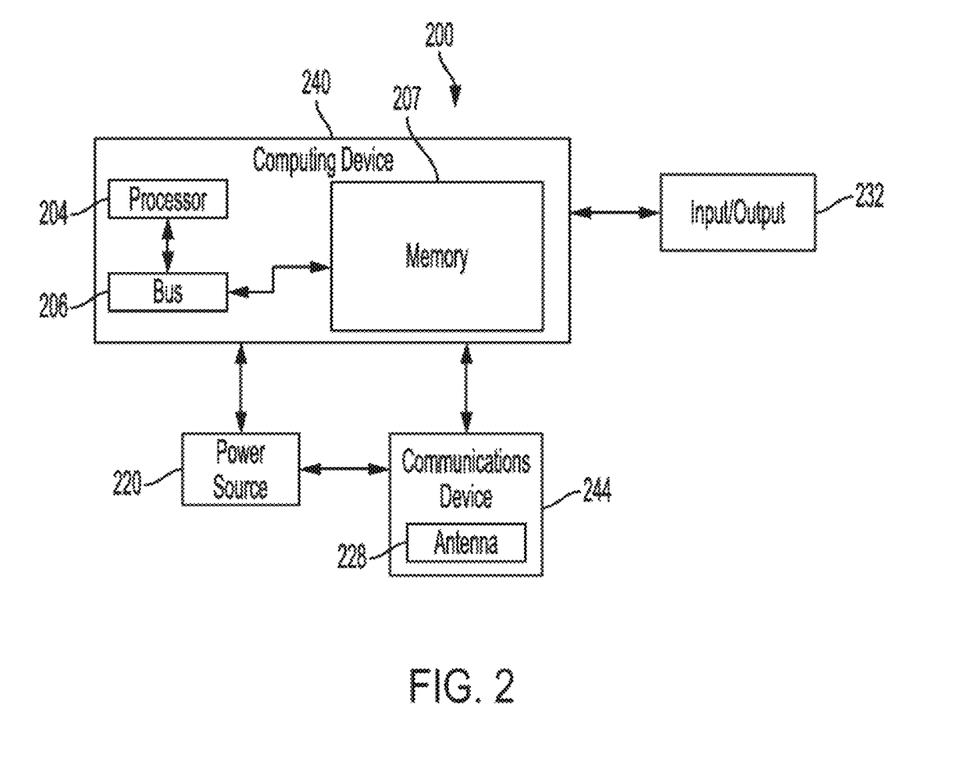
FIG. 2 is a block diagram of a system that can be used as part of a strain sensing system for monitoring fracture-induced strain near a wellbore according to some aspects of the present disclosure.

FIG. 2 is a block diagram of a system 200 that can be used as part of a strain sensing system for monitoring fracture-induced stresses near a wellbore according to some aspects of the present disclosure. In some examples, the components shown in FIG. 2 (e.g., the computing device 240, power source 220, and communications device 244) can be integrated into a single structure. For example, the components can be within a single housing. In other examples, the components shown in FIG. 2 can be distributed (e.g., in separate housings) and in electrical communication with each other.

The system 200 includes a computing device 240. The computing device 240 can include a processor 204, a memory 207, and a bus 206. In some aspects, the processor 204 can execute one or more operations of computer program code instructions for monitoring fracture-induced strain near a wellbore using a strain sensing system, e.g., by receiving sensor data from strain sensors in the strain sensing system that can be used to create models usable to adjust the treatment of a well system (e.g., the well system 100 discussed above with respect to FIG. 1). The processor 204 can execute instructions stored in the memory 207 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the internal bus 206. The non-volatile memory 207 may include any type of memory device that retains stored information when powered off. Non-limiting examples of the memory 207 include electrically erasable and programmable read-only memory ("EEPROM"), flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ('RAM'), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The system 200 can include a power source 220. The power source 220 can be in electrical communication with the computing device 240 and the communications device 244. In some examples, the power source 220 can include a battery or an electrical cable to a power source. In some examples, the power source 220 can include an AC signal generator. The computing device 240 can operate the power source 220 to apply a transmission signal to the antenna 228. For example, the computing device 240 can cause the power source 220 to apply a voltage with a frequency within a specific frequency range to the antenna 228. This can cause the antenna 228 to generate a wireless transmission. In other examples, the computing device 240, rather than the power source 220, can apply the transmission signal to the antenna 228 for generating the wireless transmission.

The system 200 can also include the communications device 244. The communications device 244 can include or can be coupled to the antenna 228. In some examples, part of the communications device 244 can be implemented in software. For example, the communications device 244 can include instructions stored in memory 207. The communications device 244 can receive signals from remote devices and transmit data to remote devices (e.g., a hydraulic fracturing control system if separate from system 200). For example, the communications device 244 can transmit wireless or wired communications that are modulated by data via the antenna 228. In some examples, the communications device 244 can receive signals (e.g., associated with data to be transmitted) from the processor 204 and amplify, filter, modulate, frequency shift, and otherwise manipulate the signals. In some examples, the communications device 244 can transmit the manipulated signals to the antenna 228. The antenna 228 can receive the manipulated signals and responsively generate wireless communications that carry the data.

The system 200 can receive input from sensor(s) (e.g., the strain sensors 110*a-f* discussed above with respect to FIG. 1) or historical data sources. System 200 in this example also includes input/output interface 232. Input/output interface 232 can connect to a keyboard, pointing device, display device, and other computer input/output devices. An operator may provide input using the input/output interface 232. An operator may also view an advisory display of set points or other information such as a dashboard on a display screen included in input/output interface 232.

FIG. 3 is a schematic diagram of an example of well systems 300*a*, 300*b* that may each monitor fracture-induced strain near a respective wellbore using a respective strain sensing system 301*a*, 301*b* according to some aspects of the present disclosure. The well systems 300*a*, 300*b* may be similar to or the same as the well system 100 described above with respect to FIG. 1.

The well system 300*a* may be a parent well (hereinafter "parent well 300*a*") and in some aspects may be an existing production well. The well system 300*b* may be a child well (hereinafter "child well 300*b*") and in some aspects may be a newly drilled well. The parent well 300*a* may have undergone hydraulic fracturing so that fractures 318*a-f* are formed in the subterranean formation 317 surrounding the parent well 300*a*.

Here, the parent well 300*a* may include a parent wellbore 304*a*, and the child well 300*b* may include a child wellbore 304*b*. The wellbores 304*a*, 304*b* extend from a surface 301 through the earth. A casing 302*a*, 302*b* may be positioned in each wellbore 304*a*, 304*b*. Each casing 302*a*, 302*b* may extend for a length of the respective wellbore 304*a*, 304*b* and may help support the stability of the respective wellbore 304*a*, 304*b*. Each casing 302*a*, 302*b* may include tubular casing sections connected by end-to-end couplings. In some aspects, each casing 302*a*, 302*b* may be made of a suitable material such as steel. In some aspects, cement may be injected into each wellbore 304*a*, 304*b* and allowed to set between an outer surface of each casing 302*a*, 302*b* and an inner surface of the respective wellbore 304*a*, 304*b*. The wellbores 304*a*, 304*b* may each include a substantially-vertical section 330*a*, 330*b* and a substantially-horizontal section 332*a*, 332*b*.

Each strain sensing system 301*a*, 301*b* in the respective well systems 300*a*, 300*b* may include a plurality of strain sensors 320*a-d*, 324*a-b*, a computing device 326*a*, 326*b* positionable at the surface 301 of the respective wellbore 304*a*, 304*b*, a communication link 328*a*, 328*b* between the respective strain sensors 320*a-d*, 324*a-b* and the respective computing device 326*a*, 326*b*, and a power source. In some aspects, a plurality of strain sensors 320*a-d*, 324*a-b* may be included in each respective well system 300*a*, 300*b*. Here, the plurality of strain sensors 320*a-d*, 324*a-b* may be installed in holes formed in the subterranean formation 317 surrounding the respective wellbores 304*a*, 304*b* and are shown having a wireless power source. e.g., battery power or inductive charging. However, the plurality of strain sensors 320*a-d*, 324*a-b* may be installed in any suitable manner including those described above with respect to FIG. 1. The strain sensors 320*a-d*, 324*a-b* may be any suitable type of strain sensor including those described above with respect to FIG. 1.

Similar as is described above with respect to FIG. 1, each of the strain sensors 320*a-d*, 324*a-b* may be in communication with a respective computing device 326*a*, 326*b* via a respective communication link 328*a*, 328*b*. Each computing device 326*a*, 326*b* may be positioned at the surface of the respective well system 300*a*, 300*b*. In some aspect, the computing devices 326*a*, 326*b* may be communicatively coupled with one another. Each communication link 328*a*, 328*b* may be a wired communication link, as discussed above with respect to FIG. 1, or a wireless communication link, as is shown in FIG. 3. For example, the strain sensors 320*a-d*, 324*a-b* may be an electrically based network of sensors or the strain sensors 320*a-d*, 324*a-b* may use electro-acoustic transmission by short-range acoustic transmission to a distributed antenna system fiber. Additionally, the wireless communication link may include IEEE 802.11, Bluetooth, or radio interfaces for accessing cellular telephone networks (e.g., transceiver/antenna for accessing a CDMA, GSM, UMTS, or other mobile communications network(s)).

At the surface, the well systems 300*a*, 300*b* may each include a derrick 306*a*, 306*b* positioned over a respective wellhead 308*a*, 308*b*. Each wellhead 308*a*, 308*b* may receive one or more lines 310*a*, 310*b*, 312*a*, 312*b* such that each wellhead 308*a*, 308*b* is in fluid communication with the multitude of lines 310*a*, 310*b*, 312*a*, 312*b*. Each wellhead 308*a*, 308*b* may provide hydraulic access to the respective wellbore 304*a*, 304*b*. For example, a high-pressure line 310*a*, 310*b* is depicted along with a production line 312*a*, 312*b*.

Each high-pressure line 310*a*, 310*b* may be in fluid communication with a respective mixing tank 314*a*, 314*b*, in which fluids, such as a treatment fluid, may be mixed or stored for insertion into the respective wellbore 304*a*, 304*b*. A pump 316*a*, 316*b* may be used to pump the fluids into the respective wellbore 304*a*, 304*b* during the hydraulic fracturing process of the wellbore 304*a*, 304*b*. Each production line 312*a*, 312*b* may be used to produce fluids or gases from within the respective wellbore 304*a*, 304*b* to the surface. The fluids produced using each production line 312*a*, 312*b* may be hydrocarbon fluids from the formation 317 surrounding the respective wellbore 304*a*, 304*b* or treatment fluids from after a hydraulic fracturing treatment has been completed.

During the hydraulic fracturing process, the treatment fluid can travel through the perforations through the casing 302*a*, 302*b* and the cement to form fractures 318*a-f*, 322*a-b* in the formation 317. The treatment fluid can include proppant for propping the fractures 318*a-f*, 322*a-b* open such that production fluid can flow from the formation 317 into the respective wellbore 304*a*, 304*b*.

In some aspects, the child wellbore 304*b* may extend through the same subterranean formation 317 as the parent wellbore 304*a*. The child wellbore 304*b* may by positioned at such a distance from the parent wellbore 304*a* that the hydraulic fracturing process in the child well 300*b* has the potential to cause a frac hit, or an interaction, with the parent well 300*a*. In some aspects, the frac hit may be the connection of newly formed fractures 322*a-b* of the child well 300*b* with the existing fractures 318*a-f* of the parent well 300*a*.

The strain sensors 320*a-d*, 324*a-b* may measure the same or similar strain data as described above with respect to FIG. 1 and may relay this data to the respective computing device 326*a*, 326*b*. In some aspects, each computing device 326*a*, 326b may be used to analyze the strain data to detect when an interaction between the parent well 300a and the child well 300b may occur. This is because the strain data includes the plurality of different strain tensor elements to provide a multidimensional strain measurement. The strain data may include measurements of axial strain on each wellbore 304a, 304b as well as measurements of the direction and nature of the fracture 322a-b if the fracture 322a-b grows close to the parent well 300a. The computing device 326a may transmit a signal to the computing device 326b to adjust aspects of the hydraulic fracturing process if the fracture 322a-b is measured as growing close to the parent well 300a.

For example, during the hydraulic fracturing of the child well 300b, the plurality of sensors 320a-d may monitor the strain acting upon the parent wellbore 304a and the subterranean formation 317 surrounding the parent wellbore 304a and the fractures 318a-f. As the fractures 322a-b are formed in the child well 300b, the fractures may grow towards the parent wellbore 304a and/or the already formed fractures 318a-f. The sensors 320a-d may measure the multidimensional deformation of the parent wellbore 304a and/or the subterranean formation 317. The sensors 320a-d may measure the multidimensional deformation by taking measurements in the form of strain tensor elements. The strain tensor represents the relative change in the position of points within the parent wellbore 304a or the subterranean formation 317 that have undergone deformation and is a 3×3 matrix that includes nine different dimensional elements. The sensors 320a-d may measure a plurality of these elements, e.g., the diagonal elements, which each represent multiple different dimensions of the strain acting on the parent wellbore 304a and/or the subterranean formation 317.

The sensors 320a-d may then transmit strain data, which includes the measured strain tensor elements, to one or both of the computing devices 326a. 326b. The computing devices 326a, 326b may analyze the strain data received from the sensors 320a-d and may use that strain data to adjust the hydraulic fracturing of the child well 300b. For example, the computing devices 326a, 326b may determine the magnitude and direction of the growth of the fractures 322a-b by analyzing the strain data, which may be allow the computing devices 326a, 326b to determine when the fractures 322a-b are growing close to the already formed fractures 318a-f. When it is determined that the fractures 322a-b are growing close to the already-formed fractures 318a-f, the computing device 326b may adjust aspects of the hydraulic fracturing process, e.g., adjusting the rate at which a treatment fluid is pumped into the child wellbore 304b or adjusting the location of the fracturing, so as to avoid an interwell interaction between the fractures 322a-b and the fractures 318a-f or the parent wellbore 304a.

Figure 4:
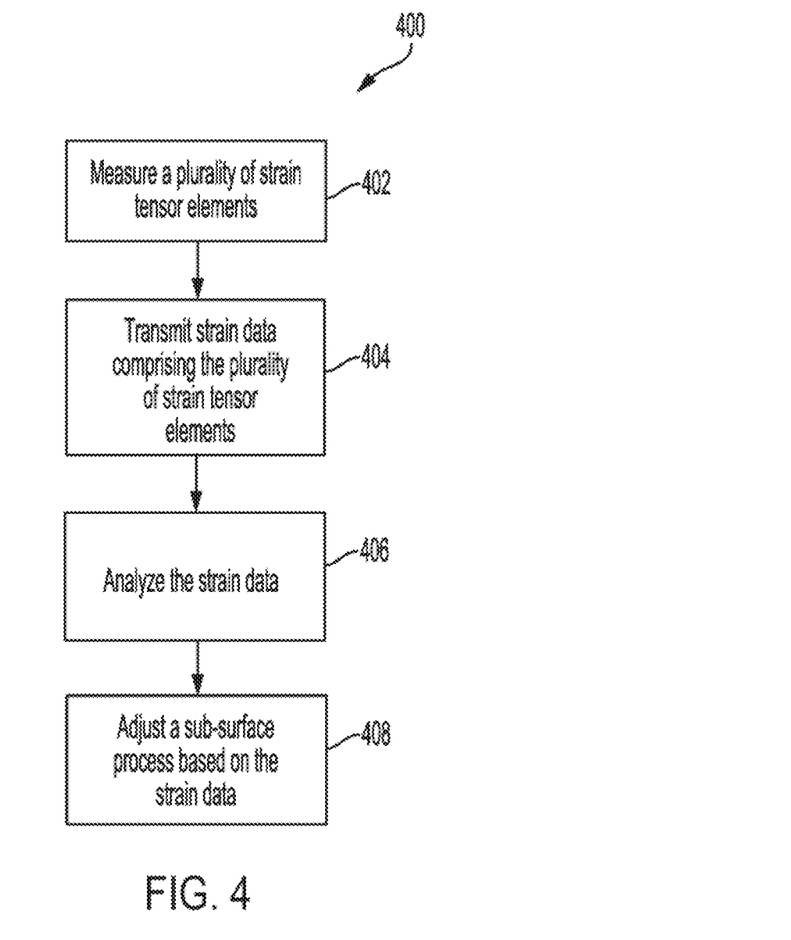
FIG. 4 is a flowchart of an exemplary process for monitoring fracture-induced strain near a wellbore using a strain sensing system according to some aspects of the present disclosure.

FIG. 4 is a flowchart of a process 400 for monitoring fracture-induced strain near a wellbore using a strain sensing system according to some aspects of the present disclosure. At step 402, the process 400 involves measuring a plurality of strain tensor elements using a wellbore vector strain sensing system.

The wellbore vector strain sensing system may be similar to or the same as the system discussed with respect to FIG. 1 or 2. For example, the wellbore vector strain sensing system may include a plurality of strain sensors 110a-f, a computing device 112, a communication link 114, and a power source 116 installed in a wellbore 104. The communication link 114 may communicatively couple the plurality of strain sensors 110a-f to the computing device 112 and enable strain data to be relayed from the plurality of strain sensors 110a-f to the computing device 112. The power source 116 may be connected to the plurality of strain sensors 110a-f to provide electrical power to the plurality of strain sensors 110a-f.

The plurality of strain sensors 110a-f may be coupled to an outer surface of a wellbore casing 106 or may be installed outside of the wellbore casing 106 for sensing, or measuring, the plurality of strain tensor elements. In some aspects, the strain tensor elements may include multiple dimensions of a strain tensor so that the plurality of strain tensor elements represent a multidimensional strain measured within an area surrounding the wellbore. For example, the plurality of strain tensor elements may be at least three strain tensor elements of the strain tensor, e.g., the diagonal strain tensor elements ($\varepsilon_{xx}$, $\varepsilon_{yy}$, and $\varepsilon_{zz}$). Other tensor elements, for instance $\varepsilon_{yx}$, may be obtained by combining readings from adjacent sensors in the wellbore, by having multiple sensors spaced some distance apart within a single sensing unit, or by employing sensors which directly measure those tensor components.

At step 404, the process 400 involves transmitting strain data comprising the plurality of strain tensor elements to the computing device via the communication link. At step 406, the process 400 involves analyzing the strain data received from the computing device. In some aspects, analyzing the strain data may include creating various models using the strain data. For example, a well system model, a fracture model, or a flow model may be created based at least in part on the strain data received from the plurality of strain tensor elements.

At step 408, the process 400 involves adjusting a sub-surface process based on the analyzed strain data. For example, the computing device may include a fracture control system, and the fracture control system may adjust a hydraulic fracturing treatment based on the analyzed strain data. For example, the amount of fluid pumped into the wellbore or the pressure of the fluid pumped into the wellbore during the hydraulic fracturing treatment may be changed by the fracture control system based on the analyzed strain data. In some aspects, a model created using the strain data may be used to determine how to adjust the sub-surface process.

In some aspects, systems and methods for monitoring fracture-induced stresses near a wellbore using a strain sensing system are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system for downhole wellbore vector strain sensing comprising: a strain sensor positionable between an outer surface of a wellbore casing and a subterranean formation for sensing a plurality of strain tensor elements, the plurality of strain tensor elements comprising multiple components of a strain tensor: a computing device positionable at a surface of a wellbore and communicatively coupled to the strain sensor; and a communication link between the strain sensor and the computing device for communicatively coupling the strain sensor to the computing device to relay strain data, the strain data comprising the plurality of strain tensor elements.

Example 2 is the system of example(s) 1, wherein the strain sensor comprises at least one of a resistive strain gauge acting on a plurality of faces of a polyhedron, a three-dimensional piezoresistive sensor, a graphene transistor strain sensor, a Fiber Bragg grating strain sensor, or a gravitational direction sensing element.

Example 3 is the system of example(s) 1, further comprising a power source for powering the strain sensor.

Example 4 is the system of example(s) 1, wherein the plurality of strain tensor elements provide a measurement of a magnitude and a direction of a change in strain.

Example 5 is the system of example(s) 1, wherein the computing device comprises a processor and a memory device coupled with the processor, the memory device containing a set of instructions that, when executed by the processor, cause the processor to: receive strain data from the strain sensor; and adjust a sub-surface process based on the strain data.

Example 6 is the system of example(s) 5, wherein the sub-surface process comprises a hydraulic fracturing treatment of the wellbore.

Example 7 is the system of example(s) 1, wherein the communication link comprises a wireless communication link.

Example 8 is a method for sensing vector strain downhole in a wellbore comprising: measuring a plurality of strain tensor elements using a wellbore vector strain sensing system; transmitting strain data comprising the plurality of strain tensor elements to a computing device via a communication link, the strain data comprising the plurality of strain tensor elements; analyzing, by the computing device, the strain data received from the computing device; and adjusting, by the computing device, a sub-surface process based on the analyzed strain data.

Example 9 is the method of example(s) 8, wherein the wellbore vector strain sensing system comprises at least one of a resistive strain gauge acting on a plurality of faces of a polyhedron, a three-dimensional piezoresistive sensor, a graphene transistor strain sensor, a Fiber Bragg grating strain sensor, or a gravitational direction sensing element.

Example 10 is the method of example(s) 8, wherein the plurality of strain tensor elements comprise multiple components of a strain tensor.

Example 11 is the method of example(s) 8, wherein the plurality of strain tensor elements provide a measurement of a magnitude and a direction of a change in strain.

Example 12 is the method of example(s) 11, wherein adjusting the sub-surface process based on the strain data comprises altering a hydraulic fracturing treatment.

Example 13 is the method of example(s) 8, wherein analyzing the strain data comprises creating at least one of a well system model, a fracture model, or a flow model based at least in part on the strain data received from the plurality of strain tensor elements.

Example 14 is a system for sensing vector strain during downhole wellbore fracturing comprising: a plurality of multidimensional strain sensors positionable between an outer surface of a wellbore casing and a subterranean formation, each of the plurality of multidimensional strain sensors sensing a plurality of strain tensor elements, the plurality of strain tensor elements comprising multiple dimensions of a strain tensor and each of the plurality of multidimensional strain sensors measuring strain around a wellbore during a sub-surface process; a computing device positionable at a surface of the wellbore and communicatively coupled to the plurality of multidimensional strain sensors for processing strain data received from each of the plurality of multidimensional strain sensors, the strain data comprising the plurality of strain tensor elements; and a communication link between each of the plurality of multidimensional strain sensors and the computing device for communicatively coupling each of the plurality of multidimensional strain sensors to the computing device to relay the strain data.

Example 15 is the system of example(s) 14, wherein each of the plurality of multidimensional strain sensors comprises at least one of a resistive strain gauge acting on a plurality of faces of a polyhedron, a three-dimensional piezoresistive sensor, a graphene transistor strain sensor, a Fiber Bragg grating strain sensor, or a gravitational direction sensing element.

Example 16 is the system of example(s) 14, further comprising a power source for powering the plurality of multidimensional strain sensors.

Example 17 is the system of example(s) 14, wherein the plurality of strain tensor elements comprise principle components of the strain tensor.

Example 18 is the system of example(s) 14, wherein the computing device adjusts a hydraulic fracturing treatment of the wellbore based on the strain data received from the plurality of multidimensional strain sensors.

Example 19 is the system of example(s) 14, wherein the strain data indicates a direction of a fracture of a second wellbore growing proximate to the wellbore.

Example 20 is the system of example(s) 19, wherein the computing device adjusts a treatment of the wellbore based on the strain data received from the plurality of multidimensional strain sensors.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system for downhole wellbore vector strain sensing comprising:
    a strain sensor positionable between an outer surface of a wellbore casing and a subterranean formation for sensing a plurality of strain tensor elements, the plurality of strain tensor elements comprising multiple components of a strain tensor, wherein the strain sensor comprises at least one of a resistive strain gauge acting on a plurality of faces of a polyhedron, a three-dimensional piezoresistive sensor, a graphene transistor strain sensor, a Fiber Bragg grating strain sensor, or a gravitational direction sensing element;
    a computing device positionable at a surface of a wellbore and communicatively coupled to the strain sensor; and
    a communication link between the strain sensor and the computing device for communicatively coupling the strain sensor to the computing device to relay strain data, the strain data comprising the plurality of strain tensor elements.

2. The system of claim 1, further comprising a power source for powering the strain sensor.

3. The system of claim 1, wherein the plurality of strain tensor elements provide a measurement of a magnitude and a direction of a change in strain.

4. The system of claim 1, wherein the computing device comprises a processor and a memory device coupled with the processor, the memory device containing a set of instructions that, when executed by the processor, cause the processor to:
    receive the strain data from the strain sensor; and
    adjust a sub-surface process based on the strain data.

5. The system of claim 4, wherein the sub-surface process comprises a hydraulic fracturing treatment of the wellbore.

6. The system of claim 1, wherein the communication link comprises a wireless communication link.

7. A method for sensing vector strain downhole in a wellbore comprising:
- measuring a plurality of strain tensor elements using a wellbore vector strain sensing system;
- transmitting strain data comprising the plurality of strain tensor elements to a computing device via a communication link, the strain data comprising the plurality of strain tensor elements;
- analyzing, by the computing device, the strain data received from the computing device; and
- adjusting, by the computing device, a sub-surface process based on the analyzed strain data, wherein adjusting the sub-surface process based on the strain data comprises altering a hydraulic fracturing treatment.

8. The method of claim 7, wherein the wellbore vector strain sensing system comprises at least one of a resistive strain gauge acting on a plurality of faces of a polyhedron, a three-dimensional piezoresistive sensor, a graphene transistor strain sensor, a Fiber Bragg grating strain sensor, or a gravitational direction sensing element.

9. The method of claim 7, wherein the plurality of strain tensor elements comprise multiple components of a strain tensor.

10. The method of claim 7, wherein the plurality of strain tensor elements provide a measurement of a magnitude and a direction of a change in strain.

11. The method of claim 7, wherein analyzing the strain data comprises creating at least one of a well system model, a fracture model, or a flow model based at least in part on the strain data received from the plurality of strain tensor elements.

12. A system for sensing vector strain during downhole wellbore fracturing comprising:
- a plurality of multidimensional strain sensors positionable between an outer surface of a wellbore casing and a subterranean formation, each of the plurality of multidimensional strain sensors sensing a plurality of strain tensor elements, the plurality of strain tensor elements comprising multiple dimensions of a strain tensor and each of the plurality of multidimensional strain sensors measuring strain around a wellbore during a sub-surface process;
- a computing device positionable at a surface of the wellbore and communicatively coupled to the plurality of multidimensional strain sensors for processing strain data received from each of the plurality of multidimensional strain sensors, the strain data comprising the plurality of strain tensor elements, wherein the computing device adjusts a hydraulic fracturing treatment of the wellbore based on the strain data received from the plurality of multidimensional strain sensors; and
- a communication link between each of the plurality of multidimensional strain sensors and the computing device for communicatively coupling each of the plurality of multidimensional strain sensors to the computing device to relay the strain data.

13. The system of claim 12, wherein each of the plurality of multidimensional strain sensors comprises at least one of a resistive strain gauge acting on a plurality of faces of a polyhedron, a three-dimensional piezoresistive sensor, a graphene transistor strain sensor, a Fiber Bragg grating strain sensor, or a gravitational direction sensing element.

14. The system of claim 12, further comprising a power source for powering the plurality of multidimensional strain sensors.

15. The system of claim 12, wherein the plurality of strain tensor elements comprise principle components of the strain tensor.

16. The system of claim 12, wherein the strain data indicates a direction of a fracture of a second wellbore growing proximate to the wellbore.

17. The system of claim 16, wherein the computing device adjusts a treatment of the wellbore based on the strain data received from the plurality of multidimensional strain sensors.

* * * * *